United States Patent [19]

Okuyama

[11] Patent Number: 5,195,411
[45] Date of Patent: Mar. 23, 1993

[54] METHOD AND APPARATUS FOR CORRECTING CUT EDGE POSITION

[75] Inventor: Koji Okuyama, Kawagoe, Japan

[73] Assignee: Bridgestone Corporation, Tokyo, Japan

[21] Appl. No.: 650,317

[22] Filed: Feb. 4, 1991

[30] Foreign Application Priority Data

Feb. 20, 1990 [JP] Japan .................................. 2-37156
Mar. 7, 1990 [JP] Japan .................................. 2-53764

[51] Int. Cl.$^5$ ............................................. B26D 7/02
[52] U.S. Cl. ......................................... 83/14; 83/175;
83/206; 83/251; 83/421; 83/452; 83/929
[58] Field of Search .................. 156/406.6; 83/13, 14,
83/18, 175, 206, 251, 276, 277, 418, 421, 452,
929

[56] References Cited

U.S. PATENT DOCUMENTS

| | | |
|---|---|---|
| 3,387,841 | 6/1968 | Menell et al. .......................... 83/452 |
| 4,493,234 | 1/1985 | Ziegler et al. ......................... 83/939 |
| 4,608,890 | 9/1986 | Still et al. ............................... 83/49 |
| 5,033,341 | 7/1991 | Müssig et al. ......................... 83/937 |

*Primary Examiner*—Hien H. Phan
*Attorney, Agent, or Firm*—Sughrue, Mion, Zinn, Macpeak & Seas

[57] ABSTRACT

A cut edge position correcting apparatus is used for correcting a direction and a wave-like contour of a cut edge of a belt-shaped member cut by a cutter unit. The cut edge position correcting apparatus includes a support base for supporting a belt-shaped member, a bending member arranged extendible above and retractable into the support base for bending the cut edge portion upwardly, and a restraining member rotatable in a horizontal plane for urging the belt-shaped member over its entire width against the support base. The apparatus further includes a lifting unit for raising and lowering the restraining member, clamp pawls for clamping the cut edge portioned, a plurality of slide plates arranged aligned with each other in a lengthwise direction of the restraining member to hold the cut edge portion over their entire widths in cooperation with the clamp pawls, and a driving unit for independently moving said slide plates relative to the restraining member. With this arrangement, cut edges can be corrected in a manner that directions of the cut edge portions clamped by the clamp pawls and the slide plates are modified by rotating the restraining member and the wave-like contours are reformed by vertically moving the slide plates.

16 Claims, 12 Drawing Sheets

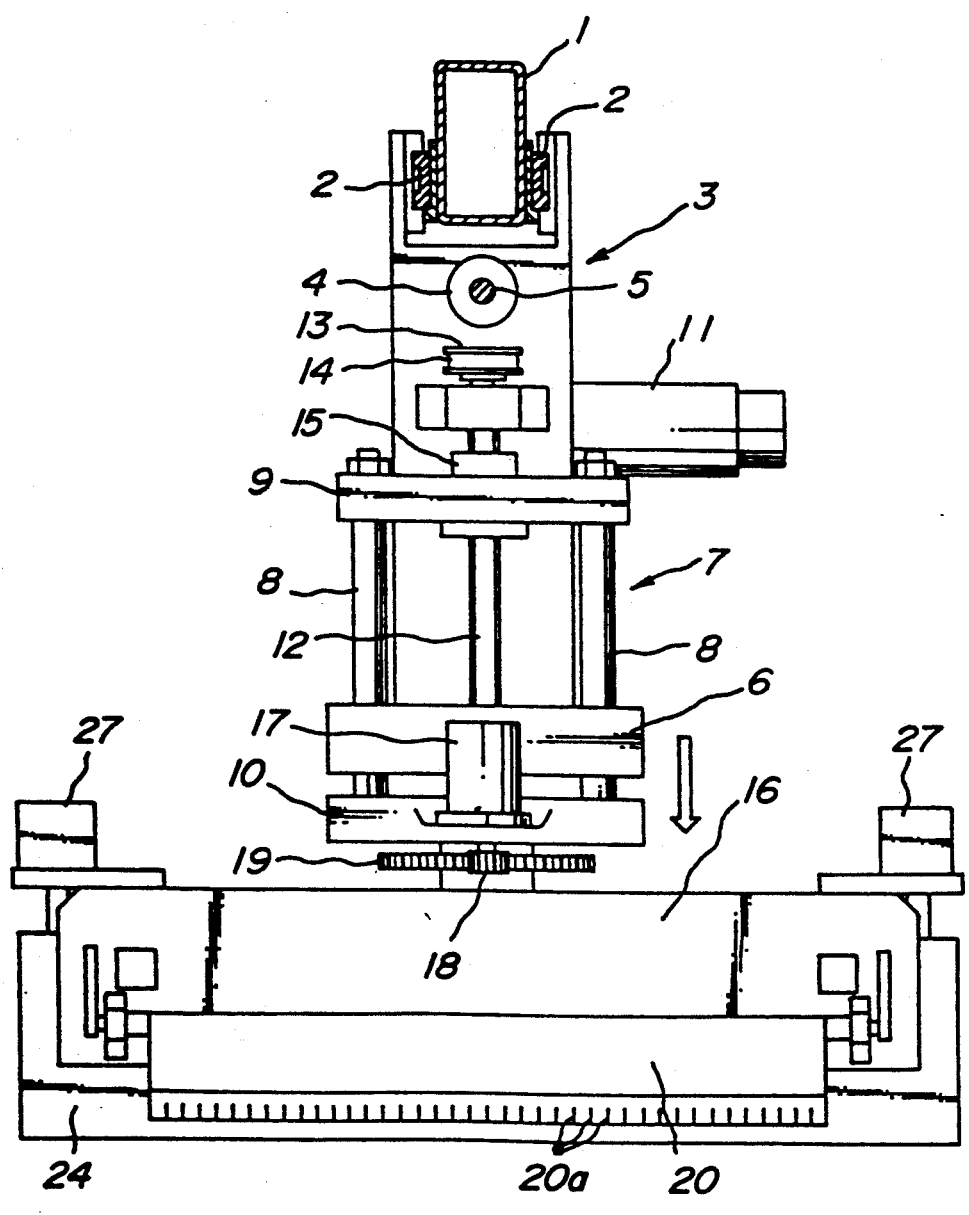
FIG_1

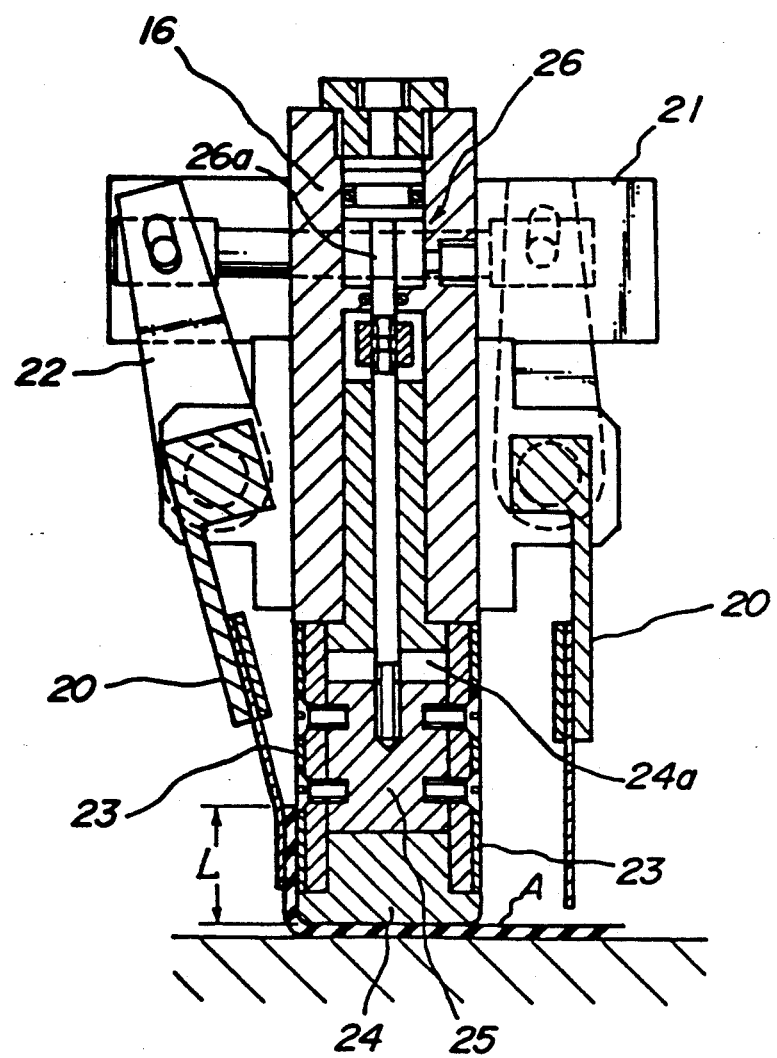
FIG_2a

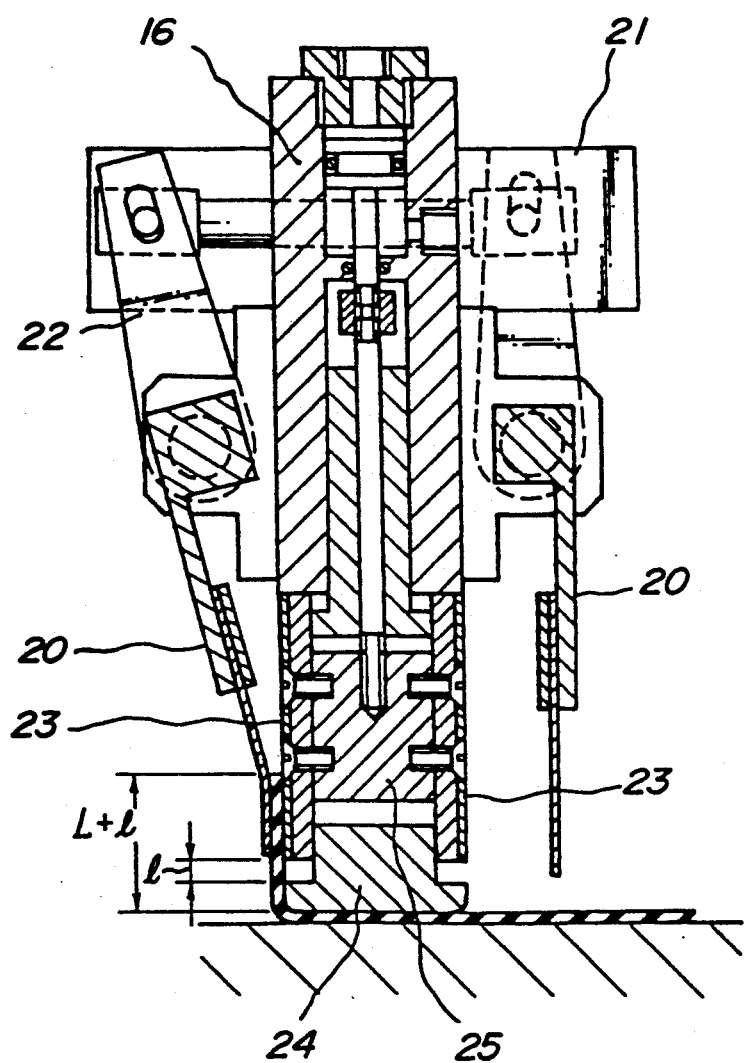
FIG_2c

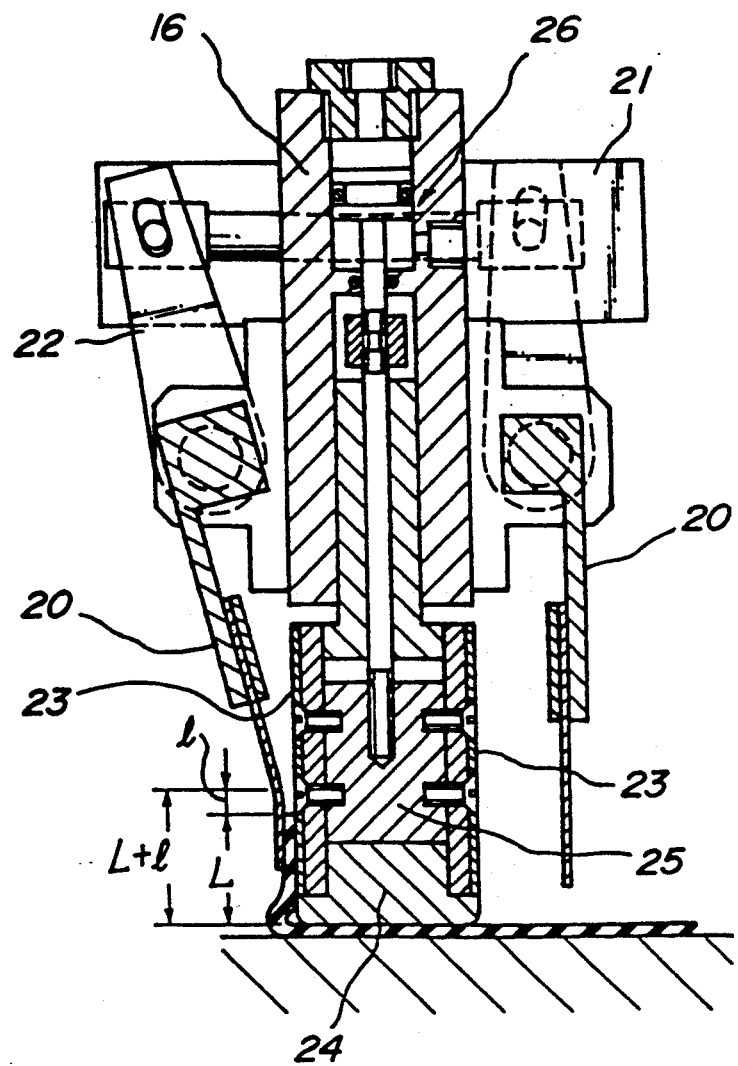
FIG_2d
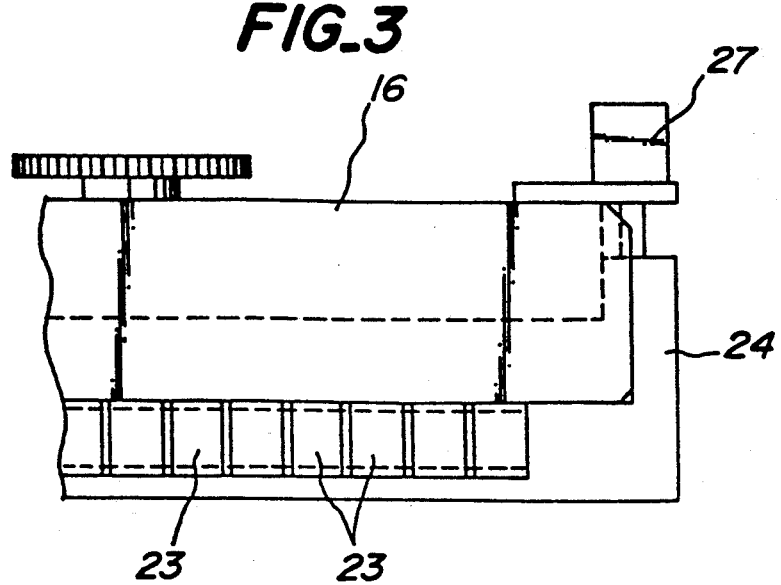
FIG_3

METHOD AND APPARATUS FOR CORRECTING CUT EDGE POSITION

BACKGROUND OF THE INVENTION

This invention relates to a method and an apparatus for correcting a position of a cut edge of a belt-shaped member, for example, carcass ply, belt layer or the like for constituting a tire to be produced into a required configuration of the cut edge, while a cut edge portion of the member is held.

An example of prior art apparatus for holding a cut edge portion of a belt-shaped member is illustrated, for example, in Japanese Patent Application Laid-open No. 64-16,630 proposed by the assignee of this application. Moreover, an example of prior art apparatus for correcting an extending direction of a cut edge of a cut edge portion which is held by suction is also illustrated, for example, in Japanese Patent Application Laid-open No. 64-30,738 proposed by the assignee of this application.

With the former disclosed holding apparatus, holding pawls are pivotally connected to both forward and rearward surfaces of a holding member extending in the width direction of a belt-shaped member and rockable about the pivoted axes with the aid of cylinders. A cut edge portion of the horizontally lying belt-shaped member is folded upwardly between the holding member and the holding pawl by an action of a bending member upwardly moving in the vertical direction. The holding pawl is then rocked to embrace the end of the belt-shaped member between the holding pawl and the holding member. In the latter disclosed correcting apparatus, grasping means are magnetically attracted to a cut edge therealong of a belt-shaped member reinforced by steel cords and in this condition the cut edge portion thereof is somewhat raised. Thereafter, the grasping means are rotated in a horizontal plane in a desired direction through a required angle by means of driving means comprising a motor and a gear mechanism so that the direction of the cut edge of the belt-shaped member is correct to a desired direction with the aid of a plasticity of the raised portion of the belt-shaped member.

Among such prior art apparatus, the former holding apparatus can hold cut an edge portion of a belt-shaped member without damaging the held portions. Moreover, with the latter correcting apparatus, a substantially straight cut edge of a belt-shaped member inclined at a constant angle to a predetermined reference straight line can be brought into a direction sufficiently close to the reference straight line.

In general, cut edges of belt-shaped members are not necessarily straight. The cut edges are often curved or wave-shaped, which were affected by embedded reinforcing cords such as steel cords or the like. However, both the prior art holding and correcting apparatus could not correct unevenness of such curved or wave-shaped cut edges. The prior art correcting apparatus can only bring an approximate straight line assumed from an uneven cut edge into a position close to the reference straight line. Therefore, in a case that front and rear edge portions of a belt-shaped member wound around a forming drum are lap-joined, overlapped amounts of the front and rear edge portions could not be uniform in the width direction of the belt-shaped member. In the case of butt-joined, moreover, the front and rear edge portions could not be butt-joined without any clearances along the entire width of the forming drum. Therefore, a problem of lower uniformity of produced tires arises with such difficulties.

SUMMARY OF THE INVENTION

It is an object of the invention to provide a method and an apparatus for correcting a position of a cut edge positions of a belt-shaped member, which solve such problems of the prior art and are capable of sufficiently effectively correcting unevenness of a wave-like cut edge and bringing an extending direction of the cut edge into coincidence with that of a reference straight line with high accuracy.

In order to accomplish the object, the method of correcting cut edge positions of a belt-shaped member cut on a support base according to the invention comprises steps of measuring positions of a cut edge of the belt-shaped member at a plurality of positions along a cut direction of the belt-shaped member, folding a cut edge portion of the belt-shaped member upwardly and holding the cut edge portion, and displacing at least one part of the cut edge of the belt-shaped member along the cut direction in a vertical direction while the cut edge portion is held.

In another aspect, the cut edge position correcting apparatus according to the invention comprises a support base for supporting a belt-shaped member, a bending member arranged in said support base and extensible from the support base, a restraining member for urging the belt-shaped member over its entire width against the support base, lifting means for raising and lowering the restraining member, at least one clamp pawl pivotally connected to the restraining member to be moved toward and away from it, a plurality of slide plates arranged aligned with each other in a lengthwise direction of the restraining member to hold one cut edge portion of the belt-shaped member over its entire width in cooperation with the clamp pawl, and driving means for independently moving said slide plates in vertical directions relative to the restraining member.

In a preferred embodiment of the invention, the restraining member is made rotatable in a horizontal plane relative to a main frame and is connected to driving means for rotatively driving the restraining member.

In a further aspect of the invention, the edge position correcting apparatus comprises a main frame reciprocatively driven in the extending direction of the belt-shaped member, a lift frame connected to the main frame to be raised and lowered by a motor and a screw mechanism provided on the main frame, a base plate extending in the width direction of the belt-shaped member and connected to the underside of the lift frame so as to be rotated relative thereto, driving means, for example, a motor and a screw mechanism provided on the lift frame for rotatively driving the base plate in a horizontal plane, a restraining member secured to the base plate for urging the belt-shaped member over it entire width against a support base, and lifting means for raising and lowering the restraining member relative to the base plate. The apparatus further comprises a clamp pawl pivotally connected to at least one surface of the base plate so as to be closed and opened in the vertical direction by the actuation of driving means such as a cylinder, a plurality of slide plates arranged below the base plate for holding the belt-shaped member over its entire width in cooperation with the clamp pawl, and lifting means provided on the base plate for raising and lowering the respective slide plates relative to the restraining member.

In correcting a cut edge of a belt-shaped member according to the method of the invention, under a condition of a cut edge portion of the belt-shaped member being upwardly directed and embraced, the cut edge is displaced upward or downward at required positions of the cut edge through distances predetermined on the basis of measured results of the cut edge. Curved or wave-like cut edges can be very effectively corrected in this manner which could not be corrected in the prior art. As a result of this, positions of the cut edge becomes even so that the problems as above described in lap-joining and butt-joining the belt shaped member can be sufficiently prevented.

It is assumed that a cut edge of a belt-shaped member has a wave-like contour as shown in a thin line in FIG. 6a and an approximate straight line X—X of the wave-like contour is inclined at an angle $\theta$ relative to a required reference straight line Y—Y or a straight line segment perpendicularly intersecting the lengthwise direction of the belt-shaped member. First, the extending direction of the restraining member is made substantially in parallel with the reference straight line Y—Y. In this condition, the front edge portion of the belt-shaped member is urged against the support base by the restraining member with the aid of the lift frame driving means. The part of the belt-shaped member on the side of the front end from the urged position is then folded upward by the bending member extending beyond the support base. The folded front end is brought into contact with surfaces of the slide plates in the opened condition of the clamp pawl. The clamp pawl is then closed to embrace the front end of the belt-shaped member over its entire width between the clamp pawl and the slide plates having surfaces treated with edging treatment.

Thereafter, the bending member is lowered and the base plate is raised somewhat together with the front end of the belt-shaped member again by actuation of the lift frame driving means. In the somewhat raised condition of the base plate together with the front end of the belt-shaped member, the base plate or the restraining member is rotated about a center position of the lengthwise direction by the rotatively driving means to an extent that the approximate straight line X—X is brought into a position in coincidence with the reference straight line Y—Y. Therefore, the approximate straight line X—X is brought substantially into coincidence with the reference straight line Y—Y, with the result that the cut front edge is corrected from the thin line to the thick line in FIG. 6a.

After the extending direction of the cut front edge has been sufficiently close to the reference straight line Y—Y, the wave-like contour of the cut edge is corrected in the following manner. For example, first the restraining member is lowered to set the front end of the belt-shaped member on the support base, while the front end being held between the clamp pawl and the slide plates. At this moment, the cut front edge of the belt-shaped member is significantly curved as shown in a phantom line on an exaggerated scale in FIG. 6b.

Thereafter, particularly projecting parts of the cut edge or the part corresponding to slide plates of Nos. 2 to 4 in FIG. 6b are lowered through the distance l together with slide plates treated with the edging treatment by lowering only the slide plates Nos. 2 to 4 through the distance l. As a result of this, the particularly projecting parts of the cut edge are lowered through the distance l, while remaining part of the cut edge are maintained at their original positions without lowering the corresponding slide plates. Therefore, the cut edge of the belt-shaped member is corrected into a substantially even position over its entire width. The downward displaced distances of the slide plates corresponding to the particularly projecting parts of the cut edge are determined relative to the restraining member and the clamp pawl by the cams provided on the cam shaft.

The belt-shaped member with the cut front edge corrected in the above manner, preferably with the cut rear edge also corrected in the same manner is then wound around a forming drum. Therefore, the front and rear edges can be lap-joined with substantially uniform overlapped portions along their width direction or can be sufficiently properly butt-joined.

According to this correcting apparatus, first the wave-like edge may be corrected and then the approximate straight line may be brought into coincidence with the reference straight line. Moreover, respective positions of the cut edge may be corrected by a plurality of correcting operations progressively without correcting only in one operation.

Furthermore, according to the correcting apparatus, downward displaced distances can be selected by rotating cams provided on a cam shaft to desired positions by means of cam rotatively driving means in connection with the state of wave-like cut edge.

The invention will be more fully understood by referring to the following detailed specification and claims taken in connection with the appended drawings.

BRIEF DESCRIPTION OF THE DRAWINGS

FIG. 1 is a front elevation illustrating one embodiment of the apparatus according to the invention;

FIGS. 2a, 2b, 2c and 2d are sectional side views illustrating sequential operating stages of the apparatus shown in FIG. 1;

FIG. 3 is a partial front view illustrating slide plates used in the apparatus according to the invention;

DESCRIPTION OF THE PREFERRED EMBODIMENTS

Figure 2B:
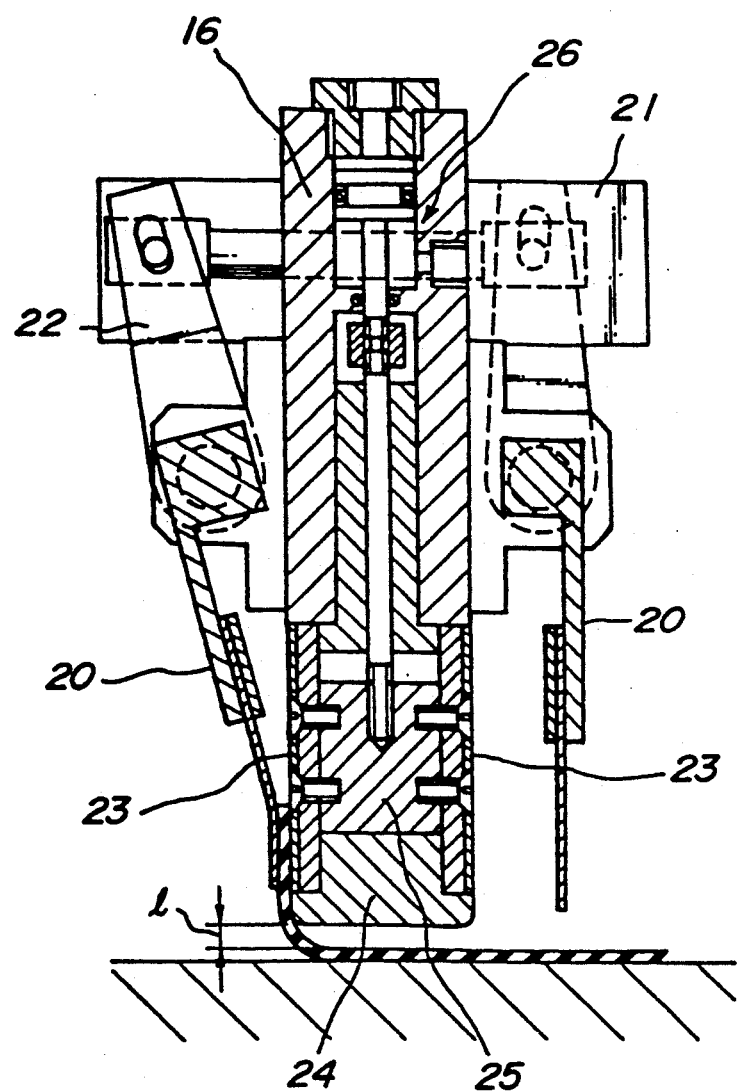

Referring to FIG. 1 illustrating in a front elevation one embodiment of the apparatus according to the invention, the apparatus comprises a hollow beam member 1 having a rectangular cross-section and extending in the extending direction of a belt-shaped member A or the direction perpendicular to the paper surface of the drawing FIG. 1, guide rails 2 fixed in the horizontal direction to side surfaces of the beam member 1, and a main frame 3 guided in reciprocative movement by the guide rails 2.

The main frame 3 in this embodiment is movable in desired directions in the following manner. A male screw member 5 extending in parallel with the beam member 1 and the guide rails 2 is threadedly engaged in a female screw member 4 fixed to the main frame 3. When a motor (not shown) is energized to be rotated so as to drive the male screw member 5 so that the main frame 3 is moved along the guide rails 2 in the desired directions.

The main frame 3 thus constructed is provided at the lower end with a bracket extending on the side of a person viewing the drawing FIG. 1. A lift frame 7 is arranged to be movable in vertical directions relative to the bracket 6. The lift frame 7 is constructed by two slide rods 8 extending through both side end portions of the bracket 6, and cross bars 9 and 10 fixed to upper and lower ends of the slide rods 8. On the main frame 3 is mounted a motor 11 whose output shaft is connected through a reduction gear to a pulley (not shown). A belt 14 extends around the pulley and a pulley 13 fixed to a male screw member 12 journaled on the main frame 3. A female screw member 15 is fixed to the upper cross bar 9 and threadedly engaged on the male screw member 12. The lift frame 7 is thus moved in vertical directions by energizing the motor 11.

A base plate 16 is connected to the underside of the lift frame 7 and rotatively driven in a horizontal plane by driving means comprising a motor 17 provided on the lower cross bar 10 of the lift frame 7, a pinion 18 mounted on the output shaft of the motor 17, and a sector gear 19 fixed to a connecting shaft between the lift frame 7 and the base plate 16.

The base plate 16 extends normally in the width direction of the belt-shaped member A. Clamp pawls 20 are pivotally supported on front and rear surfaces (at least one surface) of the base plate 16 by means of horizontal shafts and are adapted to be opened and closed by driving means comprising cylinders 21 and rocking arms 22, respectively, as shown in longitudinal section in FIGS. 2a-2d.

Moreover, each of the clamp pawls 20 is formed in its tip end with a plurality of slits 20a extending in vertical directions. The slits 20a aid in clamping sufficiently uniformly and firmly the belt-shaped member A over its entire width in cooperation with a slide plate, latter described, without being affected by a somewhat change in thickness of the belt-shaped member in its width direction and other reasons.

Furthermore, a plurality of slide plates 23 are arranged below the base plate 16 and in opposition to the clamp pawls 20 in a manner that the slide plates 23 are aligned with each other in the longitudinal direction of the base plate 16 as can be seen from FIG. 3 which is a partial front view after removing the clamp pawl 20. The slide plates 23 are treated by edging treatment on their surfaces in order to prevent the belt-shaped member held by them from sliding. The two slide plates positioned opposed across a restraining member 24 are fixed to a block 25 relatively movable in the vertical direction in a window hole 24a formed in the restraining member 24, later described in detail. Such blocks 25 are individually connected to piston rods 26a of respective cylinders 26 provided at the upper portion of the base plate 16.

With this arrangement, when pressurized fluid, for example, pressurized air is supplied into the piston chambers of the cylinders 26, the blocks 25 and hence the slide plates 23 are lowered relative to the base plate 16 in positional relation with the window holes 24a of the member 24. When the pressurized air is supplied into the rod chambers of the cylinders 26, the blocks 25 and the slide plates 23 are raised.

The restraining member 24 having window holes 24a is located on the back side of the plurality of the slide plates 23 or adjacent the opposite side to the operating surfaces of the slide plates 23 treated by the edging treatment. The upper end of the restraining member 24 extends into a channel formed in the base plate 16 up to its mid level of a height of the channel, while the lower end of the restraining member 24 extends to a position below the slide plates 23 in order to press the belt-shaped member A on the support base. In this embodiment, the upper ends of the restraining member 24 are connected to cylinders 27 mounted on the base plate 16 so that the restraining member 24 is able to move in vertical directions relative to the base plate 16 and the clamp mechanism as shown in FIGS. 1 and 3.

Moreover, when the restraining member 24 is raised, it does not extend out of the slide plates 23 and comes in contact with lower surfaces of the slide plate 23, and lower end walls of the window holes of the restraining member 24 contact a lower surface of the block 25 as shown in FIG. 2a.

Figure 4:
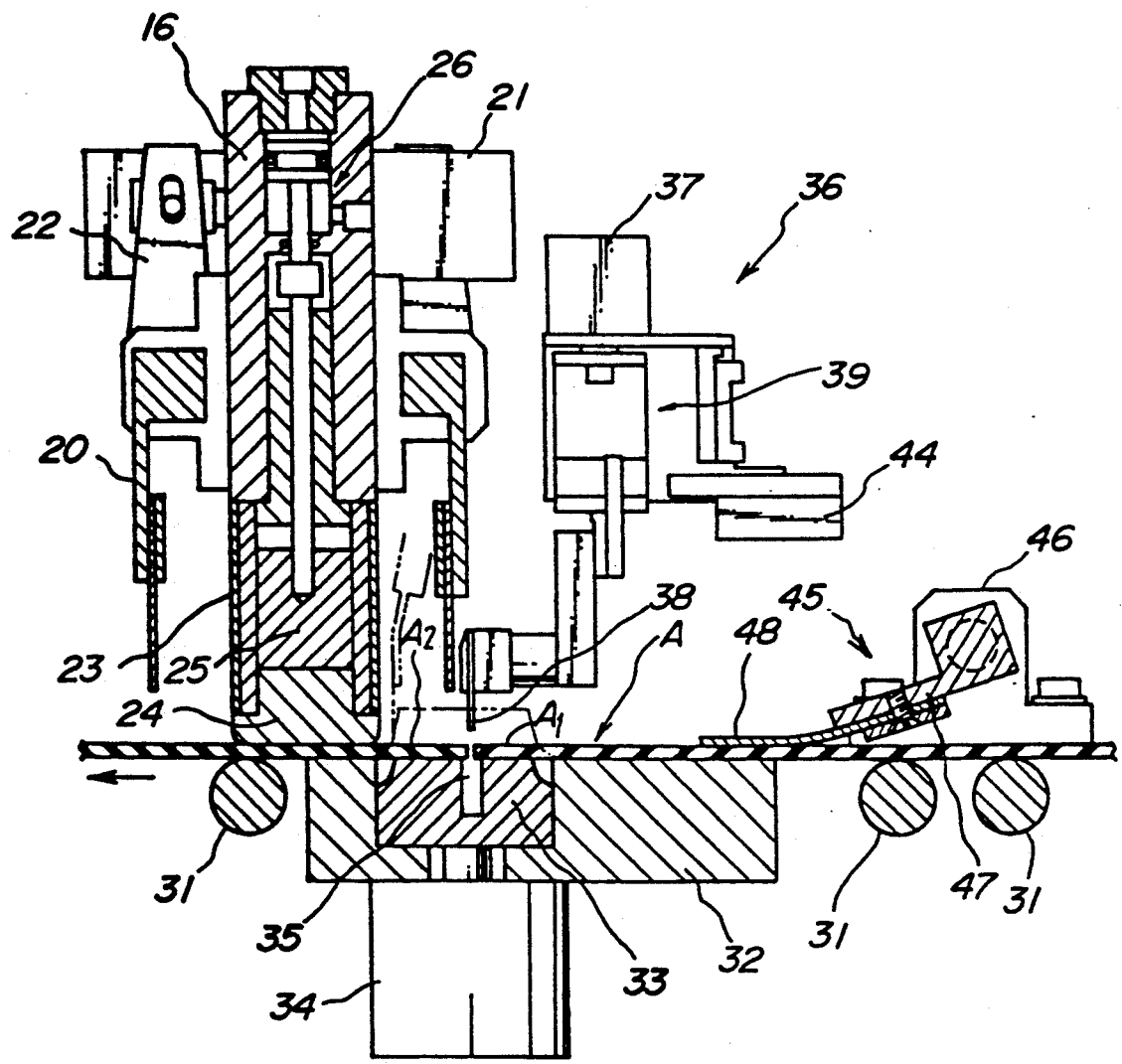
FIG. 4 is a sectional side view illustrating operations of the apparatus shown in FIG. 1.

The edge position correcting apparatus constructed as above described has to be arranged, for example, as shown in FIG. 4 in order to use the apparatus.

FIG. 4 illustrates a plurality of rollers 31 constituting transfer means for the belt-shaped member A, and a support base 32 arranged at a pre-determined position in the transfer passage between the two rollers 31. The support base 32 serves to embrace the belt-shaped member A in cooperation with the restraining member 24 rising and lowering relative to the support base.

Moreover, a bending member 33 is accommodated in the support base 32 and extending upwardly beyond the entire width of the belt-shaped member A. The bending member 33 can be raised and lowered by the action of cylinders 34 secured to the support base 32 between a lowered position shown in solid lines in the drawing and a raised position shown in phantom lines or the bending position for bending rear or front end of the belt-shaped member which has been cut. The bending member 33 includes a groove 35 at its center to permit cutter blades of a cutter unit later described to pass therethrough in the longitudinal direction of the bending member 33.

The cutter unit 36 is movable in the lengthwise directions of the belt-shaped member A, when required, by means of reciprocating driving means and causes the cutter blades 38 to pierce through the belt-shaped member A at the position shown in the drawing by actuating pneumatic cylinders 37. As can be seen from the schematic front view of FIG. 5, moreover, the respective two cutter blades 38 forming a pair of blades are held on respective cutter unit main portions 39 respectively connected to a timing belt 42 extending around pulleys 40 and 41. When the timing belt 42 is driven, the cutter unit main portions 39 are moved from the center of the width of the belt-shaped member A away from each other toward side edges of the belt-shaped member. In the movement of the main portions 39 away from each other, the belt-shaped member A is cut along its width directions by the cutter blades 38 which pierce at the center of the belt-shaped member.

Figure 5:
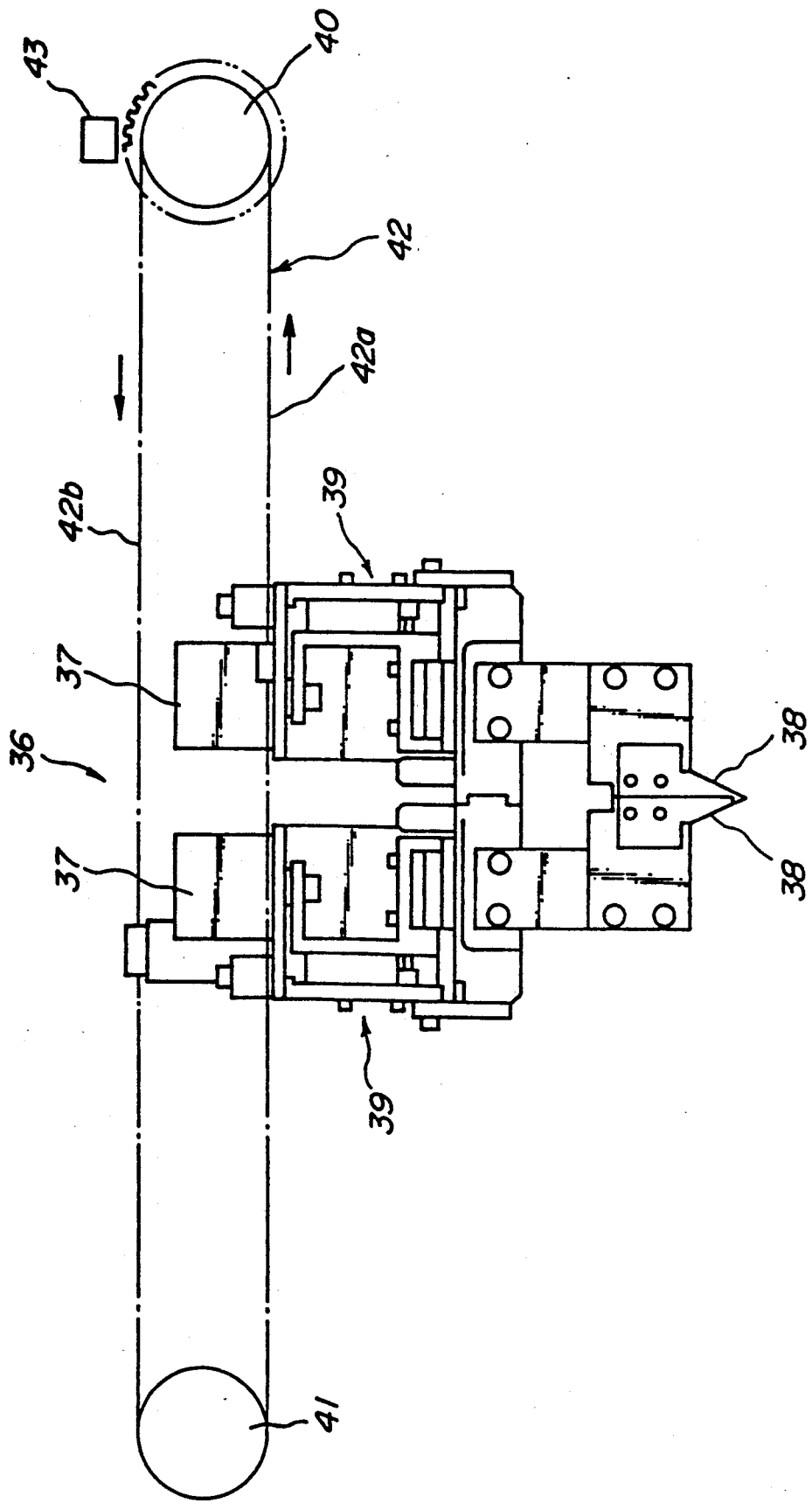
FIG. 5 is schematic front view illustrating the cutter unit used in the apparatus according to the invention.

As shown in FIG. 5, the cutter unit main portion 39 on the right side viewed in the drawing is connected to the lower run 42a of the timing belt 42, and the other cutter main portion 39 on the left side is connected to the upper run 42b of the timing belt 42. In order to measure wave-like contour of cut edges, for example, as shown in a thin line in FIG. 6a at the same time when the belt-shaped member is cut, a sensor 43, for example, contactless sensor, pulse generator, displacement sensor or the like is provided at a position associated with any one of the pulleys 40. It measures of movement distances moved of the both cutter unit main portions 39 and hence both the cutter blades 38 from the center to the side edges of the belt-shaped member A. Moreover, a displacement sensor 44 is provided to detect distances moved of the cutter blades 38 in the lengthwise directions of the belt-shaped member A (FIG. 4).

With the cutter unit as above described, after it has been moved horizontally to the cutting position shown in FIG. 4, the pneumatic cylinders 37 respectively provided on the cutter unit main portions 39 are actuated in synchronism with each other to cause both the cutter blades 38 to pierce into the belt-shaped member A at the width center. Thereafter, both the pulleys 40 and 41 are driven to move the cutter blades 38 away from each other toward the side edges of the belt-shaped member A to cut it. In this case, the distances moved of the cutter blades 38 in the widthwise and longitudinal directions of the belt-shaped member A are detected by the sensor 43 and the displacement sensor 44 to obtain the wave-like contour of the cut edge of the member.

Moreover, FIG. 4 illustrates deformation preventing means 45 which presses the belt-shaped member A over its entire width onto the support base. The deformation preventing means 45 comprises a rigid plate 47 adapted to rotate relative to its bearing 46 by means of driving means (not shown), and a leaf spring 48 fixed to the distal end of the rigid plate 47. The leaf spring 48 is formed with slits (not shown) with intervals in its longitudinal direction for accommodating the change in thickness of the belt-shaped member A to uniformly press it on the support base.

With the deformation preventing means 45 thus constructed, the leaf spring 48 is rotated to the position shown in FIG. 4 to press the belt-shaped member A onto the support base 32 in cutting the belt-shaped member A by means of the cutter unit 36 and bending the front and rear ends of the member A by means of the bending member 33. Therefore, the belt-shaped member A is sufficiently prevented from displacing and deforming on its paid out side. Moreover, the belt-shaped member A can be paid out sufficiently smoothly when the leaf spring 48 is disengaged from the surface of the belt-shaped member A.

Figure 6A:
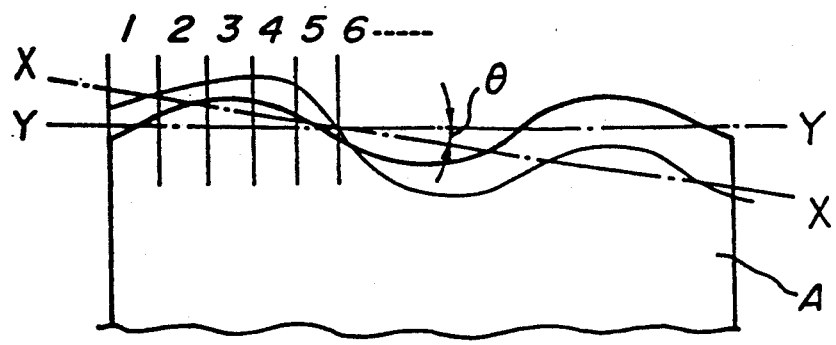
FIGS. 6a and 6b are plan views on exaggerated scales illustrating correcting operations of a cut edge according to the invention.

In using the edge position correcting apparatus combined with other means, if a cut front edge of the belt-shaped member A has a wave-shaped contour as shown in the thin line in FIG. 6a, the contour is detected by signals from the sensor 43 and the displacement sensor 44 as above described. Also an approximate straight line X—X of the wave-shaped contour is obtained by arithmetic operation of the signals.

First the case of a correction of the cut edge in a manner that the approximate straight line X—X is brought substantially into coincidence with, for example, a reference straight line Y—Y extending in the direction perpendicular to the longitudinal direction of the belt-shaped member A, and then the wave-like contour of the cut edge with unevenness is made similar to a flat shape as closely as possible will be explained. The correcting apparatus is moved as a whole in the longitudinal direction of the belt-shaped member A with the aid of the female and male screw members 4 and 5 so that the base plate 16 and the restraining member 24 are positioned between the bending member 33 and the deformation preventing means 45 above the support base 32. In this case, moreover, the cutter unit 36 has previously been displaced to a position where it does not interfere with the correcting apparatus. The leaf spring 48 of the deformation preventing means 45 has been pressing the belt-shaped member A since it is being cut.

In the condition of the base plate 16 extending substantially in parallel with the reference straight line Y—Y, the lift frame 7 is lowered so that the restraining member 24 urges the front end of the member A against the support base 32. The bending member 33 is then raised above the support base 32 so that the front end $A_1$ of the belt-shaped member A is folded upwardly to be brought into contact with the surfaces of the slide plates 23 in the condition of the clamp pawl 20 clear of the surfaces of the slide plates 23. Thereafter, the cylinder 21 and the rocking arm 22 are actuated to move the clamp pawl 20 toward the slide plates 23 so that the front end $A_1$ of the member A is embraced over its entire width between the clamp pawl 20 and the slide plates 23 as shown in FIG. 2a.

Thereafter, the bending member 33 is lowered to the original position, while the leaf spring 48 is moved away from the belt-shaped member A. Moreover, the base plate 16 is somewhat raised together with the belt-shaped member A by the rising of the lift frame 7. In the somewhat raised condition of the base plate 16 together with the member A, the base plate 16 is rotated about the connecting shaft by means of the driving means to an extent that the approximate straight line X—X is brought to a position in coincidence with or closest to the reference straight line Y—Y. Therefore, the approximate straight line X—X is brought substantially in coincidence with the reference straight line Y—Y, with the result that the cut front edge of the material A is displaced from the thin line to the thick line shown in FIG. 6a.

After the extending direction of the cut front edge of the member A has been sufficiently close to the reference straight line Y—Y, the lift frame 7 is lowered or raised in the condition of the belt-shaped member A somewhat raised as above described or after the belt-shaped member A is once returned to the original position as shown in FIG. 2a. As a result of this, the distance between the lower surface of the restraining member 24 and the upper surface of the belt-shaped member A becomes l as shown in FIG. 2b. With the base plate 16 and the clamp mechanism being maintained as they are, in other words, the front edge of the belt-shaped member A being kept embraced between the clamp pawl 20 and the slide plates 23 treated by the edging treatment, the restraining member 24 is lowered by the action of the cylinders 27 fixed to the base plate 16 to the position where the restraining member 24 urges the belt-shaped member A as shown in FIG. 2c. Consequently, the distance L between the front edge of the belt-shaped member A and the lower surface, of the restraining member 24 in FIG. 2a becomes L+l over the entire width of the member A as shown in FIG. 2c. At this moment, the position of the front edge of the member A is shown in a phantom line in FIG. 6b.

Figure 6B:
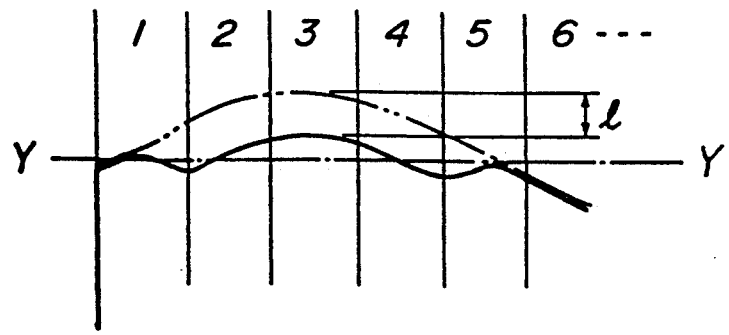

Thereafter, particularly projecting parts of the front edge or the parts corresponding to slide plates 23 of Nos. 2 to 4 in FIG. 6b are lowered through the distance l together with slide plates 23 treated with the edging treatment by lowering only the slide plates 23 of Nos. 2 to 4 through the distance l with the aid of the actuations of the corresponding cylinders 26 as shown in FIG. 2d. As a result, the parts of the cut front edge corresponding to the slide plates 23 of Nos. 2 to 4 are lowered through the distance l as shown in the thick line in FIG. 6b, while remaining parts of the cut front edge are maintained at their original positions without lowering the corresponding slide plates 23. Consequently, the cut front edge of the belt-shaped member A is corrected into a substantially even position over its entire width.

The extending direction of the cut front edge is brought substantially into coincidence with that of the reference straight line Y—Y to correct the wave-like contour of the cut front edge sufficiently in this manner. Thereafter, the lift frame 7 is raised together with the base plate 16 so that belt-shaped member A is raised to a predetermined level. The entire correcting apparatus is then transferred together with the front edge of the belt-shaped member A to a forming drum (not shown) by the rotation of the male screw member 5, with the result that a belt-shaped member A of a required length is paid out of a winding roll (also not shown).

Thereafter, the base plate 16 is lowered to pressure-join the front end of the belt-shaped member A to the surface of the forming drum and clamp pawl 20 is then released. The base plate 16 is again raised, leaving the belt-shaped member A on the forming drum. The bent front end $A_1$ of the belt-shaped member A is sufficiently attached on the forming drum by actuating the clamp mechanism and the like.

After the front end of the belt-shaped member A has been transferred to the forming drum, the correcting apparatus in the raised position is retracted, while the forming drum is rotated to wind the belt-shaped member A around the forming drum over substantially its one circumference. Consequently, a belt-shaped member A of a predetermined length is paid out of the wound roll.

Thereafter, as shown in FIG. 4, the belt-shaped member A is pressed by the leaf spring 48 and is urged by the restraining member 24 at a position ahead of the bending member 33. In this condition of the belt-shaped member A of which displacement and deformation are restrained, it is cut along its entire width at the position in opposition to the groove 35 of the bending member 33 by the cutter unit 36.

After the belt-shaped member A has been cut in a predetermined length, the cutter unit 36 is retracted and the leaf spring 48 is disengaged from the belt-shaped member A on its paying out side. The rear edge portion $a_2$ of belt-shaped member A cut in the predetermined length is then folded by the action of the bending member 33 and held between the slide plates 23 and the clamp pawl 20 on the opposite side to the clamp pawl 20 above described.

In this case, moreover, if the cut rear edge is in a wave-like shape and/or its approximate straight line is inclined to the reference straight line as the cut front edge above described, the operations similar to those for correcting and reforming the cut front edge are carried out to correct and/or reform the cut rear edge.

The lift frame 7 is then raised to move the cut belt-shaped member A upwardly. Following thereto, the correcting apparatus is synchronized with rotating operation of the forming drum and advanced toward the forming drum at a speed of a constant ratio to the rotating speed of the forming drum. As a result of, the remaining portion of the belt-shaped member A is attached under a constant tension to the forming drum.

In overlap-joining or butt-joining the front and rear ends of the belt-shaped member A on the forming drum in case of need, such a joining of the edge portions is accomplished sufficiently properly by urging the edge portions against the forming drum by operating the restraining member 24 in after-treatment.

After a series of these operations have been completed, the correcting apparatus is raised and retracted to be brought into the position ready for carrying out the same operations hereafter as those above described.

Therefore, the correcting apparatus according to the invention is able to bring the extending direction of a cut edge of the belt-shaped member substantially into coincidence with the reference straight line and to correct the wave-like contour of the cut edge sufficiently to mitigate unevenness of the cut edge effectively. Accordingly, front and rear edge portions of the belt-shaped member can be overlapped substantially uniformly in the width direction on the forming drum, or the front and rear edges can be suitably butt-joined.

While one application of the edge position correcting apparatus according to the invention has been explained, it will be apparent that the intersection angle between the side edges of the belt-shaped member and the reference straight line may be suitably selected, and with any intersection angles the apparatus according to the invention can bring about functions and effects similar to those as above described.

Another embodiment of the apparatus according to the invention will be explained with reference to FIGS. 7 to 10a and 10b.

Figure 7:
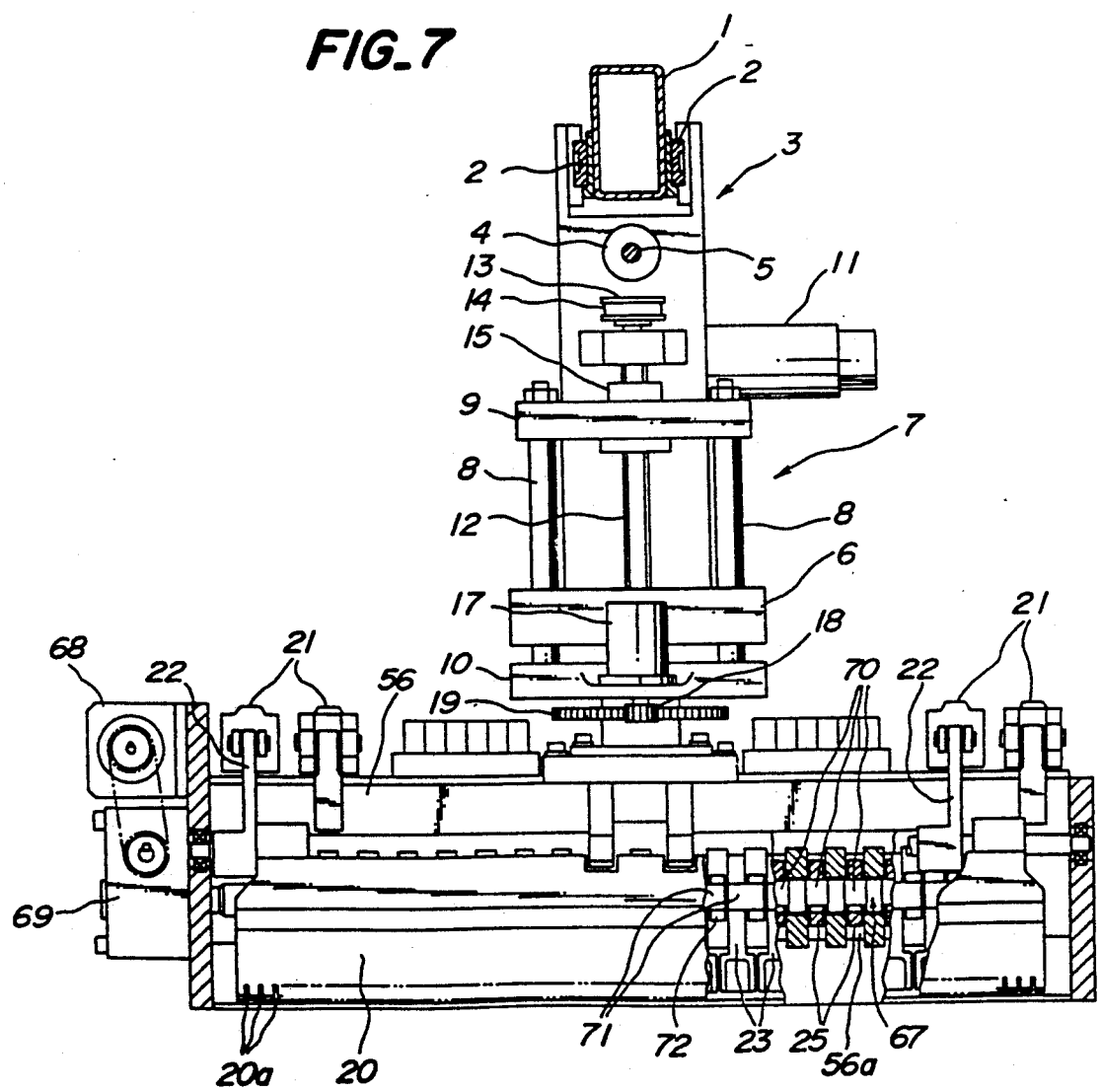
FIG. 7 is a front elevation illustrating another embodiment of the apparatus according to the invention.

FIG. 7 illustrates principal parts of the apparatus according to this embodiment, wherein like components are designated by the same reference numerals as those of the first embodiment shown in FIGS. 1 to 5. The like parts will not be described in further detail and different parts will be explained hereinafter.

Components positioned above a pinion 18 and a sector gear 19 in FIG. 7 are substantially the same as those in FIG. 1. Instead of the base plate 16 in FIG. 1, a restraining member 56 is connected to the underside of a lift frame 7 and rotatively driven by driving means constructed by the same components as those in FIG. 1.

Figure 8A:
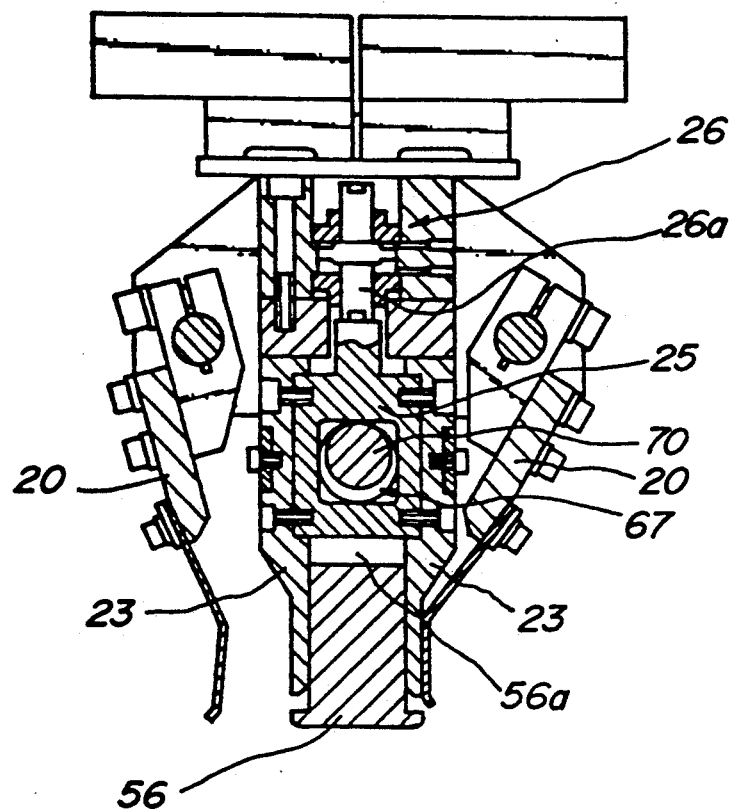
FIGS. 8a and 8b are sectional views illustrating restraining member of the apparatus shown in FIG. 7.

The restraining member 56 extends normally in the width direction of the belt-shaped member A. Clamp pawls 20 are pivotally supported on front and rear surfaces (at least one surface) of the restraining member 56 by means of horizontal shafts provided thereat and are adapted to be opened and closed by driving means comprising cylinders 21 and rocking arms 22 connected to the cylinders 21, respectively, as shown in longitudinal section in FIG. 8a. FIG. 8a is a sectional view illustrating one clamp pawl closed and the other pawl opened.

A plurality of slide plates 23 are arranged below the restraining member 56 and are moved in vertical directions in window holes 56a of the restraining member 56 by the action of cylinders 26 in the same manner of the slide plates 23 in FIG. 3.

Downward displaced distances of the slide plates 23 relative to the restraining member 56 are determined in the following manner. A cam shaft 67 horizontally extends through the restraining member 56 and the blocks 25 and is rotated when required by rotatively driving means, for example, comprising a servomotor 68 and a reduction gear device 69. In rotating the cam shaft 67, distances between surfaces of cams 70 provided on the cam shaft 67 and upper surfaces of the through-holes of the blocks 25 are suitably adjusted to determine the downward displaced distances of the slide plates 23 relative to the restraining member 57. Each of the slide plates 23 can be lowered to the position where the upper surface of the through-hole of the block 25 abuts against the cam surface.

Figure 8B:
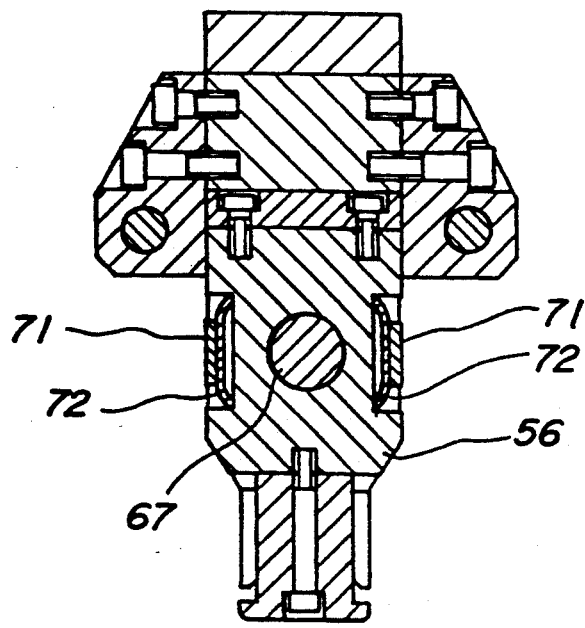

With this apparatus according to this embodiment, the slide plates 23 should be prevented from unintentionally lowering together with the belt-shaped member A when the member A is embraced between the slide plates 23 and the clamp pawl 20 and/or the member A is being raised under a condition having predetermined clearances between the upper surfaces of the through-holes of the blocks 25 and the cam surfaces. For this purpose, each of the slide plates 23 is provided with an arm member 71 fixed thereto and extending therefrom, and a spring 72 is provided between the arm member 71 and the restraining member 56. Therefore, the slide plates 23 are restrained from lowering by frictional forces between the spring 72 and the arm members 71 as shown in FIG. 8b.

Figure 9:
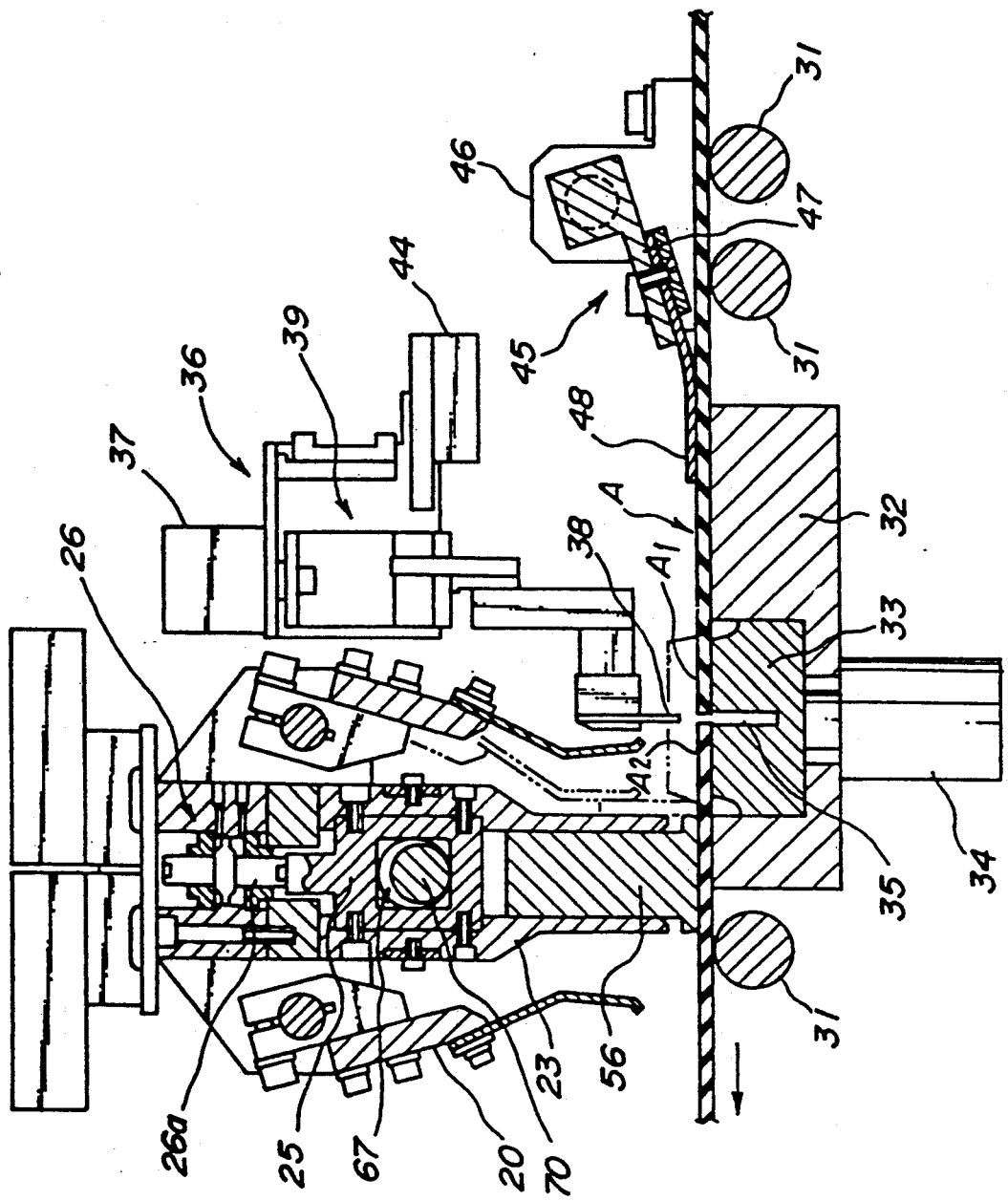
FIG. 9 is a sectional side view illustrating operations of the apparatus shown in FIG. 7.

The edge position correcting apparatus according this embodiment is used after combined with additional units as shown in FIG. 9. FIG. 9 illustrates a plurality of rollers 31, a bending member 33, a cutter unit 36 having sensors, and deformation preventing means 45. These means are substantially the same as those in the first embodiment.

With the apparatus according to this embodiment, a wave-like contour of a cut edge of a belt-shaped member A can be corrected in the manner that the wave-like contour is detected by signals from the sensors 43 and 44. After obtaining an approximate straight line X—X by the arithmetic operation of the signals, the straight line X—X is brought into coincidence with the reference straight line Y—Y and the wave-like contour with unevenness is made similar to a flat shape as close as possible. This procedure is substantially the same as that in the first embodiment. Therefore, it will be explained briefly to emphasize different points.

The restraining member 56 is positioned between the bending member 33 and the deformation preventing means 45. The lift frame 7 is then lowered so that restraining member 56 urges the front end of the belt-shaped member A against the support base 32. The bending member 33 is then raised above the support base 32 so that the front end $a_1$ of the belt-shaped member A is folded upwardly and embraced over its entire width between the clamp pawl 20 and the slide plate 23 as shown in FIG. 10a.

Thereafter, the bending member 33 is lowered to the original position, while the leaf spring 48 is move away from the belt-shaped member A. Moreover, the restraining member 56 is raised somewhat together with the belt-shaped member A by the rising of the lift member 7. In the somewhat raised condition of the restraining member 56 together with the member A, the restraining member 56 is rotated about the connecting shaft by means of the driving means to an extent that the approximate straight line X—X is brought substantially in coincidence with the reference straight line Y—Y.

Figure 10A:
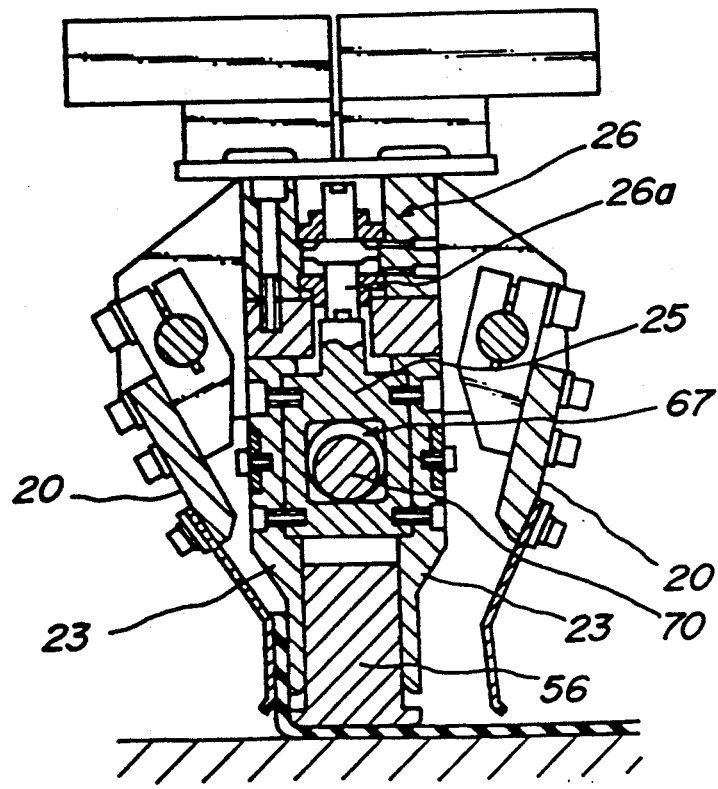
FIGS. 10a and 10b are sectional views illustrating operations of the apparatus shown in FIG. 7.
Figure 10B:
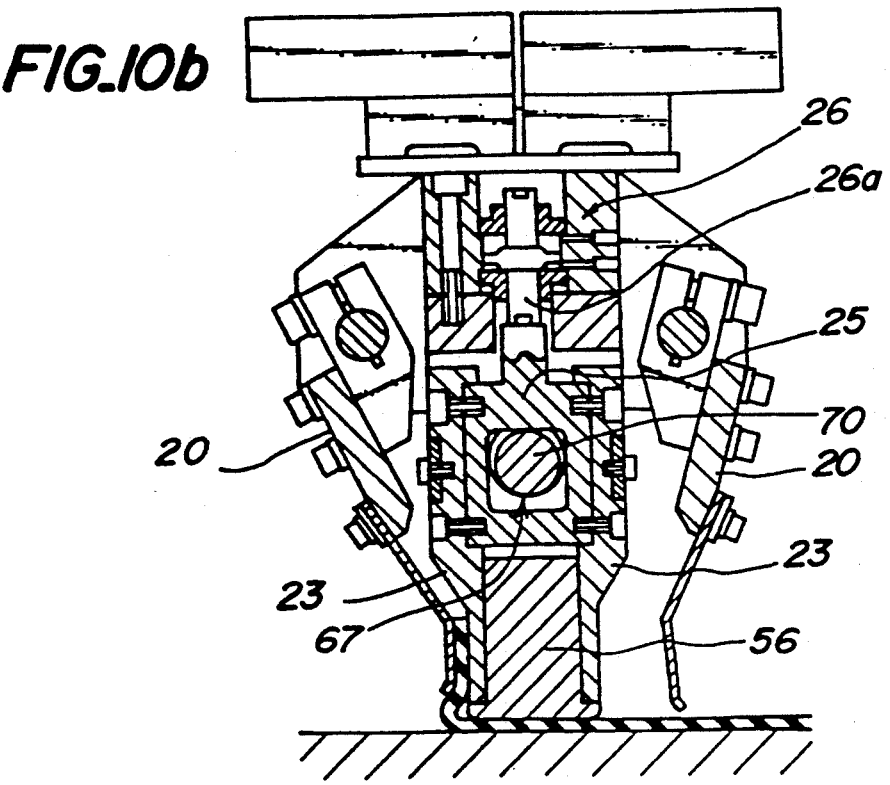

Thereafter, the belt-shaped member A is once returned to the original position shown in FIG. 10a. At this moment, the part of the cut front edge of the member A is in the position shown in the phantom line in FIG. 6b. The slide plates 23 corresponding to particularly projecting parts of the cut edge of the member A are then lowered by the action of the respective cylinders 26 to the position where the blocks 25 abut against the cams 70. The cut front edge of the belt-shaped member A is corrected into a substantially even position over its entire width. Operations followed thereto are substantially the same as those in the first embodiment.

As can be seen from the above explanation, according to the invention the unevenness of wave-like cut edges of a member can be effectively mitigated and extending directions of the cut edges can be corrected in case of need. According to the invention, therefore, a belt-shaped member can be wound around a forming drum with high accuracy so that unevenness at the joined portion of the member is remarkably reduced and the uniformity of tires to be produced is improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of correcting cut edge position of a belt-shaped member cut on a support base, comprising steps of; determining a position of a cut edge of the belt-shaped member at a plurality of positions along a cut direction of the belt-shaped member, folding a cut edge portion of the belt-shaped member upwardly, holding the folded cut edge portion, and correcting the position of the cut edge by displacing at least one part of the cut edge of the belt-shaped member along the cut direction in a vertical direction while the cut edge portion is held.

2. The method of correcting cut edge position of a belt-shaped member cut on a support base as set forth in claim 1, wherein the folded cut edge portion is rotated relative to a longitudinal direction of the belt-shaped member to straighten the cut edge into coincidence with a straight line while holding the cut edge portion over its width in the cut direction.

3. The method of correcting cut edge position of a belt-shaped member cut on a support base as set forth in claim 1, wherein the folded cut edge portion is lifted by a predetermined distance as the whole to increase a distance from the upper surface of the support base to the cut edge of the folded belt-shaped member and then a projected part or parts of the cut edge of the folded belt-shaped member is lowered to correct the cut edge of the belt-shaped member into a substantially even position over its entire width.

4. A cut edge position correcting apparatus, comprising a support base for supporting a belt-shaped member, a bending member arranged in said support base and movable vertically above and retractable into the support base, a restraining member for urging the belt-shaped member over its entire width against the support base, lifting means for raising and lowering the restraining member at least one clamp pawl pivotally connected to the restraining member to be moved toward and away from the restraining member, a plurality of slide plates arranged aligned with each other in a lengthwise direction of the restraining member to hold one cut edge portion of the belt-shaped member over its entire width in cooperation with the clamp pawl, and driving means for individually moving said slide plates in vertical directions relative to the restraining member.

5. The cut edge position correcting apparatus as set forth in claim 4, wherein said bending member extends over the entire width of the belt-shaped member and being vertically moved by means of at least one cylinder provided on the support member and formed with a groove to permit cutter blades cutting the belt-shaped member along its cut direction to pass therethrough.

6. The cut edge position correcting apparatus as set forth in claim 4, wherein the apparatus comprises a beam member extending in a longitudinal direction of the belt-shaped member, a main frame reciprocatively movable along the beam member, and a lift frame supporting therebelow said restraining member and vertically movable relative to the main frame to form said lifting means for the restraining member.

7. The cut edge position correcting apparatus as set forth in claim 6, wherein said restraining member is rotatively driven in a horizontal plane by means of driving means.

8. The cut edge position correcting apparatus as set forth in claim 4, wherein said clamp pawl is pivotally connected to the restraining member by means of a horizontal shaft which is rotated by means of driving means comprising a cylinder and a rocking arm connected to the cylinder, thereby clamping and releasing the one cut edge portion of the belt-shaped member in cooperation with the slide plates.

9. The cut edge position correcting apparatus as set forth in claim 4, wherein said restraining member is formed with window holes in which blocks are arranged to be independently movable in vertical directions, and the two slide plates positioned opposed across the restraining member are fixed to each of the blocks.

10. The cut edge position correcting apparatus as set forth in claim 9, wherein said driving means for said slide plates are cylinders provided at an upper portion of the restraining member, piston rods of said cylinders being connected to said blocks.

11. The cut edge position correcting apparatus as set forth in claim 9, wherein said slide plate comprises lowered distance regulating means which comprises a cam shaft horizontally extending through said restraining member and said blocks, cams provided on the cam shaft correspondingly to said slide plates, respectively, and rotatively driving means for driving the cam shaft, thereby enabling downward distances of said slide plates relative to the restraining member by adjusting distances between surfaces of said cams and upper surfaces of through holes of the blocks through which the cam shaft extends.

12. The cut edge position correcting apparatus as set forth in claim 4, wherein each of the slide plates is provided with an arm member fixed thereto and extending therefrom, and a spring is provided between the arm member and the restraining member, thereby frictionally holding the slide plate by frictional force between the spring and the arm member.

13. The cut edge position correcting apparatus as set forth in claim 4, wherein said restraining member comprises a base plate as a part of the restraining member and extending in a cut direction of the belt-shaped member.

14. The cut edge position correcting apparatus as set forth in claim 13, wherein the apparatus comprises a beam member extending in a longitudinal direction of the belt-shaped member, a main frame reciprocatively movable relative to the beam member, and a lift frame supporting therebelow said base plate and vertically movable relative to the main frame to form said lifting means for the restraining member.

15. The cut edge position correcting apparatus as set forth in claim 14, wherein said base plate is rotatively driven in a horizontal plane by means of driving means.

16. The cut edge position correcting apparatus as set forth in claim 13, wherein said clamp pawl is pivotally connected to the base plate by means of a horizontal shaft which is rotated by means of driving means comprising a cylinder and a rocking arm connected to the cylinder, thereby clamping and releasing the one end of the belt-shaped member in cooperation with the slide plates.

* * * * *